Figure 1:
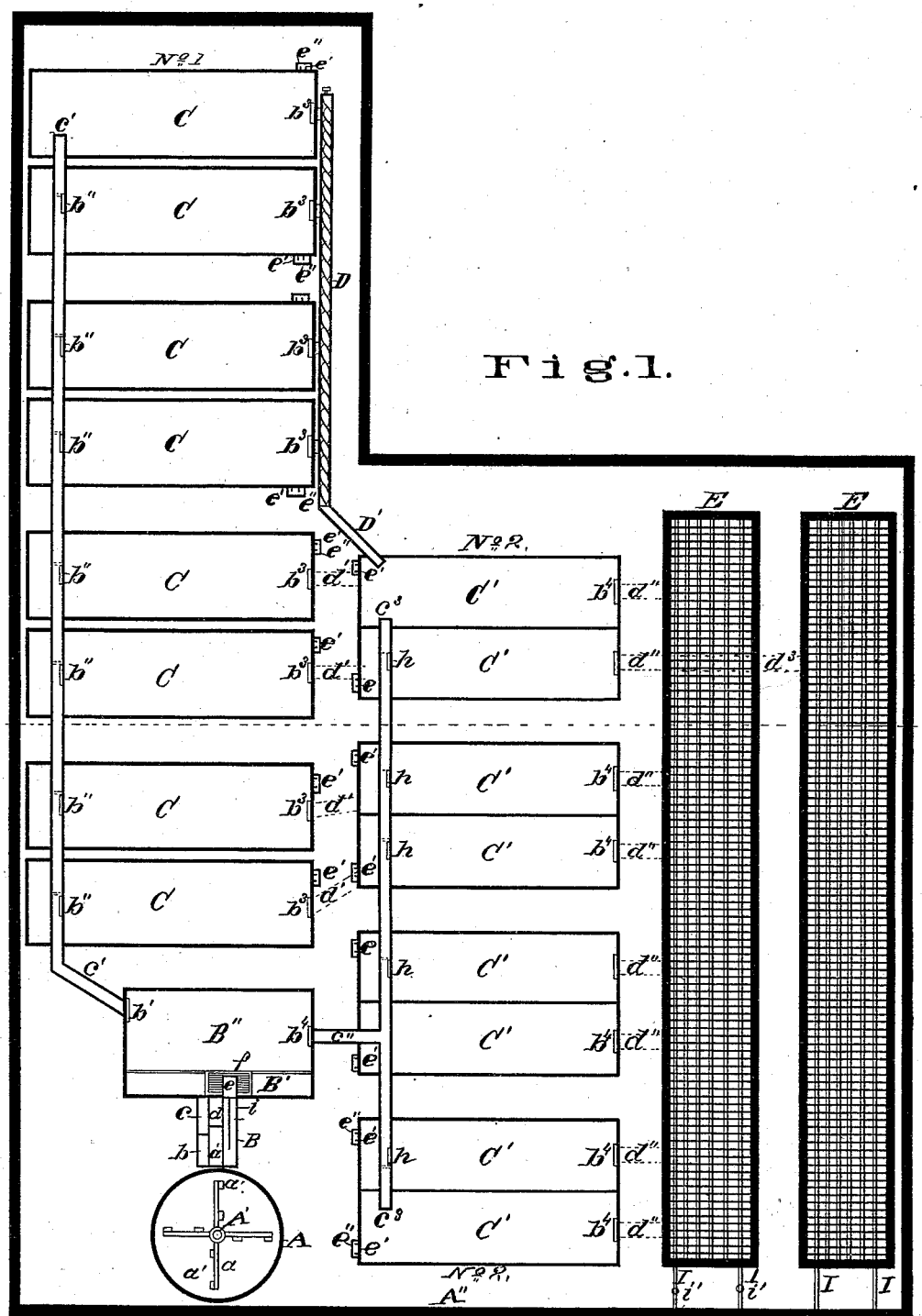

2 Sheets—Sheet 1.

W. T. CHRISTY, Sr., C. M. CHRISTY & W. T. CHRISTY, Jr.
Purifying Fire-Clay.

No. 215,434. Patented May 20, 1879.

ATTEST
W. T. Moffat
J. E. Price

INVENTOR.
William T. Christy
Calvin M. Christy
William T. Christy Jr.
Per Jos. E. Ware, Attorney.

N. PETERS, PHOTO-LITHOGRAPHER, WASHINGTON, D. C.

2 Sheets—Sheet 2.

W. T. CHRISTY, Sr., C. M. CHRISTY & W. T. CHRISTY, Jr.
Purifying Fire-Clay.

No. 215,434. Patented May 20, 1879.

Attest.
J. E. Price
W. F. Moffat

Inventor.
William T. Christy
Calvin M. Christy
William T. Christy, Jr.
Per Jos. E. Ware, Attorney

UNITED STATES PATENT OFFICE.

WILLIAM T. CHRISTY, SR., CALVIN M. CHRISTY, AND WILLIAM T. CHRISTY, JR., OF ST. LOUIS, MISSOURI.

IMPROVEMENT IN PURIFYING FIRE-CLAY.

Specification forming part of Letters Patent No. 215,434, dated May 20, 1879; application filed March 17, 1879.

*To all whom it may concern:*

Be it known that we, WILLIAM T. CHRISTY, Sr., CALVIN M. CHRISTY, and WILLIAM T. CHRISTY, Jr., of the city of St. Louis, and State of Missouri, have invented certain new and useful Improvements in the Purification of Fire-Clays and Apparatus therefor; and we do hereby declare that the following is a full, clear, and exact description of the invention, which will enable others skilled in the art to which it appertains to make and use the same, reference being had to the accompanying drawings, and to the letters of reference marked thereon, which form a part of this specification.

Our invention relates to an improved process for the purification of fire-clays intended for glass-house pots or other refractory clay forms, and to apparatus therefor.

The invention consists in a new and improved arrangement of apparatus, and a process for the separation and elimination from clay of silica, when in excess, iron pyrites, lime, alkalies, sulphuric acid, or sulphates, and whereby, in the first stages of the strictly mechanical part of the operation, the stony or coarse sandy particles separate and subside to the bottom of a large tub or vat. In this tub or vat a perpendicular shaft turns in the axis of the tub, bearing cross-arms, one set below the other, the various sets of which are connected by upright staves, giving the movable arms the appearance of multifold opposite paddles revolving with the shaft. This wooden frame-work or stirrer turns round against the water and clay, (the water used therefor being rain-water and heated,) and by constant action beats the clay lumps into a fine paste, from which the coarse stony and sandy particles separate and settle to the bottom. Herein is the first separation, the matters which settle being iron pyrites, of sizes from mustard-seed to more than an ounce-weight, gravel, sand, and slate-flakes.

Whenever a quantity of the paste formed has acquired a cream-like and uniform consistency it is run off through a faucet into a labyrinth consisting of a series of square trough-like passages, connecting one with the other, until it is discharged upon a screen which rests horizontally over a final separating-pool; but in each of these passages are vertically-set screens of varying fineness, between which are settling-pools, in each of which a portion of the sand or other coarse particles settle, and out of all of which frequent clearance must be made.

The clay-liquor, after passing through the last or fourth screen, enters a long narrow and shallow cistern, where it is presumed to have left everything which practically can be separated in that way before it passes by overflowing into a large storage-cistern of equal depth. From the storage-cistern the clay liquor is drawn off through a launder, from which it can be turned by drawing a sliding gate into any one of a range of long shallow settling-vats. These vats are provided with a series of spigot-holes from the bottom up, through which can be drawn and discharged the clear water supernatant to the settled clay. From this range of settling-vats the paste, now of a consistency too dense to freely flow off, is drawn into a conveyer-trough. The movement of the conveyer therein passes it out to a short launder, which conveys it to vat-range No. 2, which is closer to the clay-furnace. The clay-furnace is about sixty feet long, and against this the second range of settling-vats abut for convenience in their discharge into the clay-furnace. Here the exclusively mechanical features of the process cease, and in the clay-furnace chemical or mutual reciprocal action of one agent upon the other takes place, stimulated by the heat and by the decomposing action of the iron of the pipes and grates, which results in elimination from the mass of nearly all the matters deleterious to the quality of the clay thus treated for making glass-house pots or any other refractory clay forms.

Figure 2:
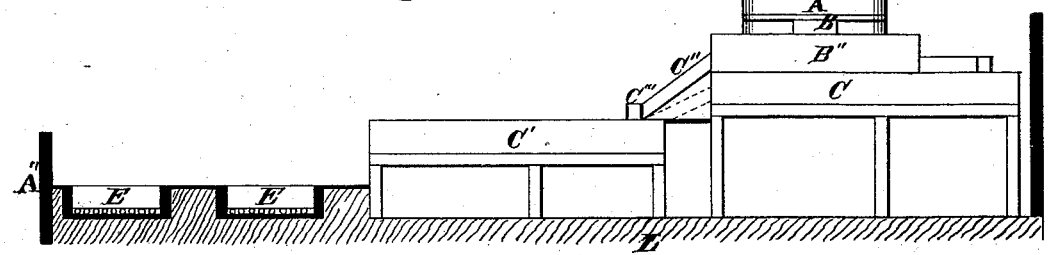
Figure 3:
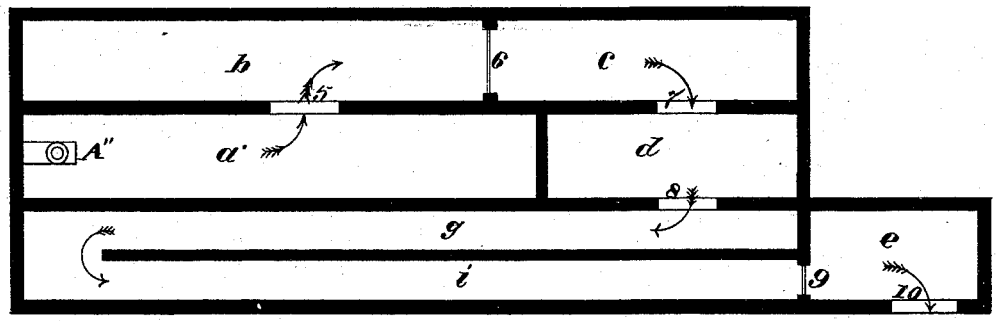
Figure 4:
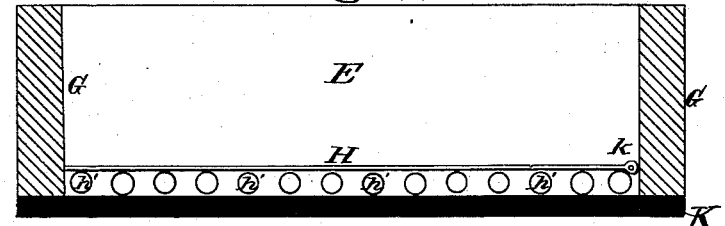
Figure 5:
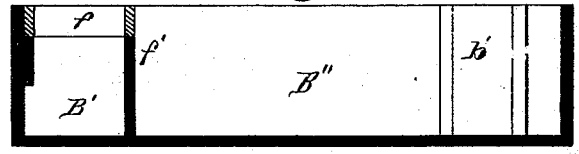
Figure 6:
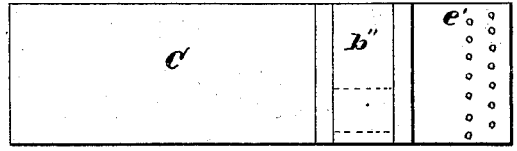

In the accompanying drawings, in which similar letters indicate corresponding parts, Figure 1 is a plan view, which shows the consecutive order followed in passing the clay from the blunger-vat to its final discharge from the clay-furnaces. Fig. 2 shows, part in perspective and part in cross-section, the order in descension of the matters from the same starting-point to the same terminus. Fig. 3 is a plan view of the screening and settling labyrinth into which the clay-liquor is passed from the blunger-vat. Fig. 4 is a cross-section of a clay-furnace, showing the position of the steam-pipes for evaporation and purification, and thereon a grating for purposes hereinafter to be shown. Fig. 5 is a cross-section of the storage-cistern B″, having partitioned off therefrom the settling-pool B′, from which the clay-liquor must pass by overflowing the lip of the slit $f'$. Fig. 6 is an end view of one of the vats C, with the sliding discharge-gate and the spigot-tiers for drawing from the surface of the settled clay its supernatant water.

Into the blunger-tub A, when nearly filled with warm rain-water, the raw clay is thrown and carefully regulated as to quantity and periods of supply to be acted upon by the vertical blades $a'$ on the arms $a$, which pass transversely through the upright shaft A′, which stands in an axis in the bottom of the said blunger-tub A. Out of the said blunger-tub the liquor formed by the comminution of the clay in the water is passed at short intervals through the faucet A″, Fig. 3, passing in the direction indicated by the arrows, or from $a$, through vertical screen 5, into pool $b$, next through screen 6 into pool $c$, through screen 7 into pool $d$, thence through screen 8 into the split pool-passages $g\ i$, thence through screen 9 into pool $e$, and by the gate-screen 10 on to the large screen $f$, and into the final settling-pool B′, which, by being able to contain a considerable quantity of the liquor, and the overflow-slit $f'$, intercepts nearly all residual sand, pyrites, or slate which may have traveled so far.

It will be here seen that nearly complete separation and subsidence of obnoxious matters is provided for in the several screen-pools and settler B′. When the storage-vat B″ fills up to the overflow-lip $f'$, the settled clay-liquor passes into the launder-trough $c'$ or $c''$ by opening the gates $b'$ or $b''$, while by drawing any of the gates $b''$ or $h$ the corresponding settling-vat can be filled, and when in any settling-vat the clay has so subsided and become freed from its supernatant water as to require removal to a position nearer the furnace, the thick cream-like matter from the vats C can, by the intervening short launder $d'$, be transferred to the opposite vats, C′, while the vats of the same range which are distant can have their contents passed into the said vats C′ by opening any of their gates $b^3$ into the conveyer-trough D, the conveyer of which will force it through the short launder D′ into C′, while, by the slip-launder $d''$ or $d^3$, it can be passed from the said vats C′ into either of the furnaces.

It is intended, with ordinary furnace capacity for finishing the clay, that in the said vats C′ the clay-cream from vats C should be doubly increased in density; but with active furnace capacity the vats C′ can be filled direct from the said storage-cistern B″ via gate $b^4$, and said slip-launder $c''$ and long launder $c^3$ in like manner as launder $c'$ is operated. The water supernatant to the clay in all the vats is intended to be drawn off at successive levels by means of the spigot-ranges $e'\ e''$. (Best shown at $e'$, Figs. 1 and 6.)

The furnaces E are composed of the strong timbers G, Fig. 4, to form the sides and ends of evaporating troughs or furnaces in length about sixty by six feet and one foot deep, the bottoms of which are of tiles K on the ground surface, lying longitudinally in said trough and on the tiles. The steam-pipes $h'$ are arranged (thirty in number, more or less) to be supplied by steam from the supply-pipes I, which have shut-off valves $i'$. The pipes are close together, either longitudinally or transversely. On the top of the steam-pipes we place the grates H, preferably of half-inch to three-quarter inch steel rods, which are stiffer than iron.

These grates are attached for convenience to the said timber side G in short hinged sections, as at $k$. These hinges permit the grates being turned up against the sides of the furnace during the operation of cleaning.

The purpose of the grates is to protect the steam-pipes from the shovels of the stirrers, whereby an acidulous scale which forms on the pipes is liable to be cut loose and returned to the once purified clay, to its great detriment. They also furnish a convenient floor upon which the workmen can stand while digging out the completed charge. The pulley 1 on the shaft 2 moves by the pinion 3 the bevel-wheel 4 on the head of the shaft A′, the connection being by belting with the actuating-power.

The condition of the clay becomes greatly changed during the several hours of active boiling, stirring, and evaporation to which it is there subjected, and it settles in the vats to a thin mortar-like consistency. When the clay is placed in the clay-furnace the proportion of water therein is about fifty per cent., of which thirty-five per cent. is removed in the furnace.

Notwithstanding the previous separation process there still is found in the clay mass, when it comes to the furnace, iron pyrites in extremely fine particles, sulphates of iron, alumina, and the alkalies.

The effect of the boiling and contact with the hot pipes, conjoined with the effect of the rain-water, is to decompose the pyrites, render entirely soluble all the previously partially soluble sulphates, and establishing a changed form or condition of the matters detrimental to the clay. Thus, in the stiff clay mass, after finished treatment, it will be found that the clay has parted with most of the injurious matters, and the iron pipes have drawn to themselves a thick laminated scale containing the elements so opposite to the qualities in the clay, which go to the formation of practically refractory fire-clay forms for technical or other uses.

It is not yet fully determined to our minds to which precise point in the furnace operation the marked results produced are due. The theory is that the effects from the rain-water, the heating, and stirring for so long a period, attended by a decompositional action of the iron pipes, which actually suffer loss, cause a transfer from one combination to another, in exchange probably for a higher atomic representation of hydrogen.

The operation generally expressed of our process and treatment and the high degree of refinement of our clay is entirely due to the primary close separation of the coarse and obnoxious matters, through their specific gravity, allowing the clay-liquor to pass but slightly contaminated to the settling-vats, and thence to the furnace, where it undergoes finally a very radical refinement.

To keep the steam-coil to its average evaporative efficiency, we clean the pipes frequently, an effective way being to put on the pipes three or four inches of water in depth, and boil it for several hours, then draw it off and use pipe and hose to remove the scales; or the steam may be turned on the pipes until the scale becomes perfectly dry, and then apply the water, and with the pipe and hose sweep out the crumbled scale.

We do not claim the reduction of clay to a paste in the manner herein stated. We do not claim the settling-vat operation, nor the evaporative action of a steam-coil in a furnace as herein described, these not being new.

What we claim as our invention is—

1. In the separation of substances deleterious to the refractory character of fire-clay, the labyrinth consisting of the pools $a'$ $b$ $c$ $d$ $e$ and split pool $g$ $i$, the vertical screens in partitions 5 6 7 8 9 10, and horizontal sieve $f$ and pool $B'$, with its overflow-lip $f$, all as combined, and for the purposes specified.

2. In the elimination from fire or other clays of substances deleterious to their refractoriness, the comminution in rain-water of clay to a clay-liquor, and its subsequent treatment by pooling, screening, settling, and final purification in contact with iron pipes in a clay-furnace, as specified.

3. In combination, the steam-pipes $h'$ and grate H, as and for the purposes specified.

4. In the separation and cleaning of accreted clay-scales from clay-furnace steam-coils, the heating to dryness of the scale on the pipes, and its disintegration and removal by flooding, or by directing strong jets of water thereon from hose and pipes therefor, as specified.

In testimony that we claim the foregoing as our own invention we affix our signatures in presence of two witnesses.

WILLIAM T. CHRISTY, Sr.
  CALVIN M. CHRISTY.
  WILLIAM T. CHRISTY, Jr.

Witnesses:
 MAJOR ROSBOROUGH,
 FRANK A. BUSHEY.